(12) United States Patent
McQueen et al.

(10) Patent No.: US 10,866,172 B2
(45) Date of Patent: *Dec. 15, 2020

(54) SYSTEM AND METHOD FOR PREPARING CRYO-EM GRIDS

(71) Applicant: Neptune Fluid Flow Systems LLC, Palo Alto, CA (US)

(72) Inventors: Trevor Allen McQueen, Farragut, TN (US); Winnie Liang, Farragut, TN (US)

(73) Assignee: Neptune Fluid Flow Systems LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/937,872

(22) Filed: Jul. 24, 2020

(65) Prior Publication Data

US 2020/0363301 A1 Nov. 19, 2020

Related U.S. Application Data

(63) Continuation-in-part of application No. 16/823,506, filed on Mar. 19, 2020, now Pat. No. 10,770,265.

(60) Provisional application No. 62/821,857, filed on Mar. 21, 2019.

(51) Int. Cl.
*G01N 1/42* (2006.01)
*G01Q 30/18* (2010.01)
*G01Q 30/14* (2010.01)

(52) U.S. Cl.
CPC .............. *G01N 1/42* (2013.01); *G01Q 30/18* (2013.01); *G01Q 30/14* (2013.01)

(58) Field of Classification Search
CPC .......... H01J 37/261; H01J 37/26; H01J 37/28; G01N 23/06; G01N 2223/3103
USPC ........... 250/306, 307, 309, 310, 311, 440.11, 250/441.11, 442.11, 443.1
See application file for complete search history.

(56) References Cited

U.S. PATENT DOCUMENTS 10,770,265 B1 * 9/2020 McQueen .............. G01N 23/06

* cited by examiner

*Primary Examiner* — Nicole M Ippolito
(74) *Attorney, Agent, or Firm* — Chambliss, Bahner & Stophel, P.C.; Stephen D. Adams

(57) ABSTRACT

A system for producing cryogenic electron microscopy (cryo-EM) grids. A grid holding element holds a cryo-EM grid in place while a sample deposit element deposits liquid sample from a sample supply onto the grid. A sample shaping element shapes the liquid sample and then a cryogenic sample vitrifying element vitrifies the liquid sample. The shaping element may direct a gas jet towards the grid to reduce the thickness of the liquid sample. The gas jet may mix first and second liquid samples together in midair or on the grid. A storage element stores vitrified cryo-EM grids and includes an electromagnetic field (EMF) source that creates an EMF within the storage element such that the vitrified sample is exposed to the EMF. As a result of being exposed to the EMF, a protein provided with the sample is re-oriented from a first orientation to a second orientation.

19 Claims, 6 Drawing Sheets

SYSTEM AND METHOD FOR PREPARING CRYO-EM GRIDS

CROSS-REFERENCE TO RELATED APPLICATION

This application is a continuation-in-part of application Ser. No. 16/823,506, filed Mar. 19, 2020, entitled SYSTEM AND METHOD FOR PREPARING CRYO-EM GRIDS, which claims the benefit of U.S. Provisional Patent Application No. 62/821,857, filed on Mar. 21, 2019, entitled NOVEL DEVICE AND METHOD FOR PREPARING CRYO-EM GRIDS WITH HIGH RELIABILITY, REPEATABILITY AND REPRODUCIBILITY; each of the foregoing applications is incorporated herein by reference in its entirety.

TECHNICAL FIELD

This invention relates generally to electron microscopy. More particularly, the invention relates to a method and apparatus for depositing, thinning, and vitrifying liquid samples for use in electron microscopy.

BACKGROUND OF THE INVENTION

Part of the research and development cycle of pharmaceuticals is determining how an experimental drug candidate interacts with the body. This is a critical step in learning not only if the pharmaceutical is effective for its intended purpose but also what other unintended side effects it may cause. One way for identifying the effects of a new pharmaceutical is to conduct laboratory experiments that expose the pharmaceutical to biological samples (e.g., proteins) and then observing the results of that interaction over time. Among other things that may be observed during these experiments, the shape of the sample may change and these changes in shape can provide an indication of the effects that the pharmaceutical would have on a body. In other words, these structural characterization studies show the site and strength of drug molecule binding. To ensure that the results of these tests are accurate, it is important to begin the experiment with a biological sample that is as close to its natural state and shape as possible with high structural and functional integrity. If the shape of a biological sample is altered or damaged before a test is conducted, the results of the test may not accurately reflect how the pharmaceutical being tested would affect the body in real life. Similar arguments are also valid in other fields such as materials science that involve looking at component interactions in the liquid state.

Cryogenic electron microscopy (cryo-EM) is an electron microscopy technique involving the imaging of biological materials in a transmission electron microscope under cryogenic conditions. In cryo-EM, high-voltage electrons are generated in a vacuum by an electron source (i.e., an electron gun). Those electrons are focused into a fine beam and are then directed towards and through a sample located on a movable stage. After passing through the sample, the electrons either scatter or hit an image recording system that includes an electron detector to generate an image. However, before any imaging or analysis can occur in the cryo-EM process, the samples must be prepared. During the sample preparation stage, sample proteins, which are presumed to be randomly oriented and homogenously dispersed in an aqueous environment, are captured in a thin layer of vitreous ice by being cooled very quickly (generally, in less than a millisecond) to cryogenic temperatures. When samples are prepared properly, the vitreous ice layer can trap biological matter in its natural form and provides a thin (generally, less than 3 micrometers thick), clear sample that is well suited for cryo-EM imaging and analysis. Cryo-EM may also be used in other scientific fields, including materials science, nanomedicine, and renewable energy.

Thus, sample preparation is a very important step in cryo-EM analyses. However, sample preparation is often complex, difficult, and costly. One common issue is the inability to reliably and precisely control the thickness of the vitreous ice formed when preparing a sample on a cryo-EM grid. Since electrons must transmit through a cryo-EM sample for an image to be formed, it is necessary that the sample layer be thin enough to transmit sufficient electrons to form an image with minimum energy loss and a high enough signal-to-noise ratio. On the other hand, if the sample layer is too thin, the sample may not be fully encapsulated by the vitreous ice and may extend through and become exposed at the air-water interface (AWI), which can cause their shape or composition to be adversely impacted. Proteins can also aggregate and become grouped too closely together if the ice layer is too thin, or they may become disassociated (i.e., torn apart) or spread too far apart from or stack on top of one another if the ice layer is too thick. Other issues, such as the formation of ice artifacts and crystallization within the ice, that cloud the ice can make obtaining an image difficult or impossible. Therefore, carefully forming the vitreous ice layer with a particular thickness and clarity is critical to obtaining good samples that are suitable for use in cryo-EM imaging and analysis.

Conventional vitrification processes rely on trial and error, and in some cases brute force, to achieve an acceptable sample grid. Typically, a cryo-EM sample is prepared on cryo-EM grids under a variety of settings or conditions, with the hope that one of those conditions will produce a vitrified sample having the desired ice thickness and clarity. With reference to FIGS. 1-3, there is illustrated an example of a conventional cryo-EM grid 100 that may be used to suspend biological samples. Grid 100 includes a flat disk 102, which is provided with an array of grid openings 104 that are formed by intersecting metallic rails 106. These rails 106 are made from a material having high thermal conductivity such as copper, nickel, aluminum, etc. A single grid opening 104' is highlighted in FIG. 1 and is enlarged in FIG. 2. A film 108, sometimes called a holey carbon film, is placed on top of and is adhered to the disk 102 and covers the grid openings 104. The film 108 is provided with an array of very small holes 110 that extend through the film and across the entire surface of the disc 102.

These grids 100 are commonly used in a conventional sample preparation method known as the blotting and plunge freezing method, which can be done manually or semi-automatically with devices currently on the market. In preparing a sample for cryo-EM imaging and analysis, a droplet of a sample material is often deposited onto the film by hand using a pipette. A cross section of two of the holes 110 of grid opening 104' is shown in FIG. 3. As seen there, the sample solution 112 fills the holes 110 but a large amount of the solution collects on top of the film 108. At the blotting step, filter paper is brought into contact with the sample solution 112 and a portion of the sample solution is absorbed into the filter paper. The left hole 110 shown in FIG. 3 shows the sample solution 112 before the filter paper is used. The right hole 110 shown in FIG. 3 shows the sample solution 112 after a portion of the sample solution 112 has been removed from the grid 102 at the blotting step. The grid 100 is then vitrified by plunge freezing into a cryogen, such as liquid ethane, liquid propane, or a mixture of the two cooled by liquid nitrogen.

FIGS. 4-6 are enlarged side views of the right hole 110 shown in FIG. 3 under three different scenarios. In each case, sample solution 112 is held in the hole 110 by surface tension (i.e., capillary action) and a meniscus having a peak 114 formed at the center of the layer of sample solution on both the top and bottom of the layer of sample solution. The vertical distance between these peaks 114 defines a height H of the ice layer. In FIG. 4, too much sample solution 112 was left remaining at the blotting stage, which resulted in a vitreous ice layer having a thickness H that is too great. This is evidenced by the stacking of proteins 116 on the left-hand side and the dissociated protein shown on the right-hand side. In FIG. 5, an insufficient amount of sample solution 112 was left at the blotting stage, which resulted in an ice layer having a thickness H that is too small. This is evidenced by the exposure of the proteins 116, which extend through the water-air interface 118. In FIG. 6, an ideal amount of sample solution 112 was left at the blotting stage, which resulted in an ice layer having an ideal thickness H. This is evidenced by proteins 116 that are fully encapsulated by the ice layer and are well-dispersed throughout. Ideally, proteins 116 are homogeneous and well-dispersed in a single layer across throughout the vitreous ice layer and adopt random, as opposed to preferred, orientations. These random orientations allow the proteins to be viewed from multiple angles in a single view, enabling the three-dimensional structural reconstruction that basically projects the two-dimensional cryo-EM images back to a three-dimensional space at a later step.

As shown above, the conventional blotting and plunge freezing method is unreliable, labor intensive, and slow. Each stage of sample preparation, namely pipetting, blotting, and plunge freezing, is carried out sequentially or by hand. The actual amount of time separating each of these steps may be only seconds, but it is long enough for the samples to be adversely impacted as molecules tumble around in solution. For example, when sample solutions are initially deposited onto a grid, they may have well-dispersed and randomly-oriented individual proteins. However, after the blotting occurs but before the plunge freezing step can take place, those proteins may coalesce, disperse, readjust their configurations in solution, and adopt a preferential alignment (i.e., proteins align themselves in a particular manner and are not randomly oriented). Each of these behaviors negatively impacts the sample and makes cryo-EM imaging and the determination of protein structures more difficult.

The issue associated with preferential orientations of protein particles at the AWI is not one with a clear solution. Optimization methods include but are not limited to (1) adding detergent, (2) adding Fab fragments or IgG antibodies, (3) adding an additional macromolecular binding partner, or combinations of these methods. These optimization methods have had limited success in addressing the issue associated with preferential orientations of protein particles at the AWI. Since most soluble proteins have hydrophilic exteriors, they will naturally tend to cluster together in such a way so as to minimize their exposure to the hydrophobic air. For example, in some cases, protein molecules may point their hydrophilic regions toward the polar water molecules inside the vitreous ice layer, similar to how phospholipids are arranged at the cell membrane, which forms a barrier to the outside and leads to orientation bias.

Another major drawback to this conventional process is the cost associated with waste sample material. Generally, a 2-4 μL sample volume is required to prepare a single sample grid 100. However, 99.9% of the sample volume is lost during grid preparation, with much of this loss occurring at the blotting stage. Sample solutions, especially those protein complexes that are weakly bound or associated with small molecules as in the case of protein-drug conjugates, are often difficult and expensive to obtain due to extensive work in synthesis, extraction, and purification, etc. For that reason, attempts have been made to reduce these losses via applying a lower blotting force at the thinning step. For example, samples are sometimes gently blotted or tapped multiple times with filter papers in an attempt to thin them to the right thickness while preserving those weak intermolecular interactions and minimizing needless sample adsorption to filter papers. However, this less harsh approach simply prolongs the deposit-to-plunge time and exacerbates the above-mentioned AWI problem by allowing protein molecules more time to tumble at the interface. For that reason, it has been impossible to prepare a sample using the conventional blotting and plunge freezing method and then expect to experience no issues associated with preferential orientations and/or sample dissociation on a prepared cryo-EM grid.

Finally, to accurately model how various proteins interact with a potential drug candidate, imaging and tracking of molecular dynamics at different time points is needed. However, the current sample preparation approach does not allow for sample mixing at a timescale that matters for time-resolved studies. Nor does it provide reliable means for efficient mixing of different chemical species without the risk of a prolonged delay between sample deposition and vitrification.

Therefore, what is needed, is an improved method and apparatus for preparing biological samples for cryo-EM imaging and analysis.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiment thereof, and not to place a limitation on the scope of the invention. Nothing in the specification should be construed as indicating any element as essential to the practice of the invention unless so stated with specificity.

BRIEF SUMMARY OF THE INVENTION

The above and other needs are met by methods for preparing cryo-EM samples. The presently-disclosed method requires depositing a liquid sample having a least one protein that is receptive to and whose orientation in a three-dimensional space can be modified by an electromagnetic field (EMF) onto a sample grid using a sample dispenser and vitrifying the said sample. The method also requires exposing the sample to an EMF. As a result of being exposed to the EMF, the at least one protein of the sample is re-oriented from a first orientation to a second orientation. In some cases, the sample is exposed to the EMF after being deposited and vitrified on the sample grid. For example, in certain cases, the method requires storing the grid with the vitrified sample in a storage device having an EMF source that is configured to provide the EMF, such that the sample is exposed to the EMF while being stored in the storage device. In other cases, the sample is exposed to the EMF after being deposited onto the sample grid but before vitrification. For example, the sample grid may be exposed to a cryogenically-cooled medium that is provided with an EMF source configured to produce the EMF. In still other cases, the sample is exposed to a first EMF after being deposited onto a cryo-EM grid before vitrification and later exposed to a second EMF after vitrification.

Further disclosed is a method for producing cryo-EM grids that includes the steps of depositing a first liquid sample onto a cryo-EM grid using a first fluid dispenser such that sample located on the grid has a first thickness, shaping the first liquid sample using at least one gas jet produced by a sample shaping element, and vitrifying the sample deposited on the sample grid after the sample has been shaped by the sample shaping element. In certain embodiments, the method further requires directing the at least one gas jet of the sample shaping element towards the grid to reduce the thickness of the first liquid sample such that substantially all of the sample on the grid after the thinning has a second thickness that is less than the first thickness. In some cases, separate gas jets are directed towards opposing sides of the grid to reduce the thickness of the first liquid sample such that substantially all of the sample on the grid after the thinning has a second thickness that is less than the first thickness. In certain preferred embodiments, the thickness of the first liquid sample is reduced by the gas jets substantially simultaneously with or prior to the vitrification step. Certain embodiments of the method further require depositing a second liquid sample onto the cryo-EM grid such that liquid sample located on the grid is a combination of the first liquid sample and the second liquid sample. In some cases, the first and second liquid samples may be mixed while in midair before contacting the grid. In some cases, the first and second liquid samples are mixed together and thinned using the at least one gas jet produced by the sample shaping element after the liquid samples contact the grid.

Lastly, the above needs are also met by a system for producing cryo-EM grids that includes a grid holding element configured to hold a cryo-EM grid while a liquid sample is deposited onto the grid and while the deposited liquid sample is vitrified. A sample deposit element is configured to deposit liquid sample provided by a sample supply onto the cryo-EM grid held by the grid holding element. A sample shaping element is configured to shape liquid sample deposited onto the cryo-EM grid. Lastly, a cryogenic sample vitrifying element is configured to vitrify liquid sample deposited on the sample grid, wherein the cryogenic sample vitrifying element and the grid holding element are configured to move relative to one another.

In some cases, that system includes a storage element for storing vitrified cryo-EM sample grids having at least one protein. The system also includes an EMF source configured to create an EMF within the storage element such that the vitrified sample is exposed to the EMF. As a result of being exposed to the EMF, the at least one protein of the sample is re-oriented from a first orientation to a second orientation.

In some cases, the cryogenic sample vitrifying element includes a cryogenically-cooled stage that vitrifies sample disposed on the sample grid while the grid is in contact with the stage, a pool of cryogen that vitrifies liquid sample disposed on the cryo-EM grid when the grid is placed into the pool, or a jet of cryogen that vitrifies the sample disposed on the sample grid when the grid passes through the jet.

In some cases, the grid holding element is a gripper that has a manually-actuated mode selector that is configured to switch the gripper between an open mode and a closed mode. The gripper further includes two or more gripper arms that, when the gripper is in the open mode, are configured to spread apart and, when the gripper is in the closed mode, are configured to close and engage the cryo-EM grid with sufficient force that the grid is securely held by the gripper arms. In other cases, the grid holding element has two or more grid sites that are each configured to receive and securely hold a separate cryo-EM grid. The grid holding element is configured to move with respect to the cryogenic sample vitrifying element such that one of the two or more grid sites is located within a cryogen of the cryogenic sample vitrifying element while another one of the two or more grid sites is not located within the cryogen of the cryogenic sample vitrifying element.

In some cases, a first fluid nozzle is configured to deposit a first liquid sample onto the cryo-EM grid held by the grid holding element and a second fluid nozzle is configured to deposit a second liquid sample onto the same cryo-EM grid held by the grid holding element, such that the first and second liquid samples are mixed together on the cryo-EM grid.

Finally, in some cases, the sample shaping element includes at least one gas jet configured to shape liquid sample deposited by the sample deposit element.

In order to facilitate an understanding of the invention, the preferred embodiments of the invention, as well as the best mode known by the inventor for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventor includes all equivalents of the subject matter described herein, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiments of the invention are illustrated in the accompanying drawings, in which like reference numerals represent like parts throughout, and in which.

DETAILED DESCRIPTION OF THE INVENTION

This description of the preferred embodiments of the invention is intended to be read in connection with the accompanying drawings, which are to be considered part of the entire written description of this invention. The drawings are not necessarily to scale, and certain features of the invention may be shown exaggerated in scale or in somewhat schematic form in the interest of clarity and conciseness.

As discussed above, the protein particles contained within a vitreous ice layer may not be well-dispersed across the ice layer or may not display a sufficient degree of random orientations. To reconstruct its three-dimensional structure, however, the individual protein particles need to be randomly oriented and viewed from multiple angles in a single view. It has been found that, through the application of an electromagnetic field (EMF), the orientation of individual proteins on a sample grid may be reallocated from their preferential and often biased orientation to another orientation that is preferably non-uniform and random. This may occur after deposition of the sample liquid on the grid surface and, more preferably, after vitrification.

Figure 1:
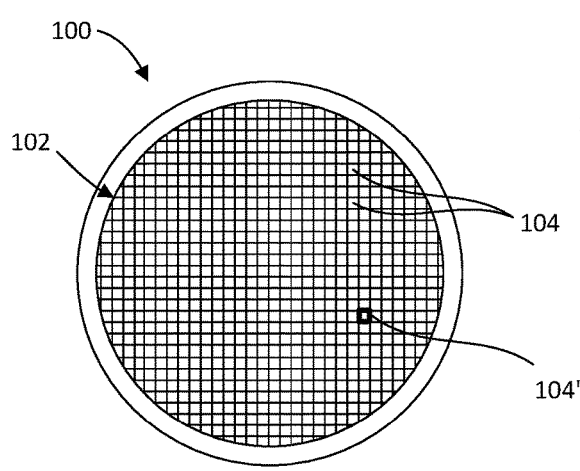
FIG. 1 is a plan view depicting a sample grid that has been conventionally used in connection with electron microscopy.
Figure 2:
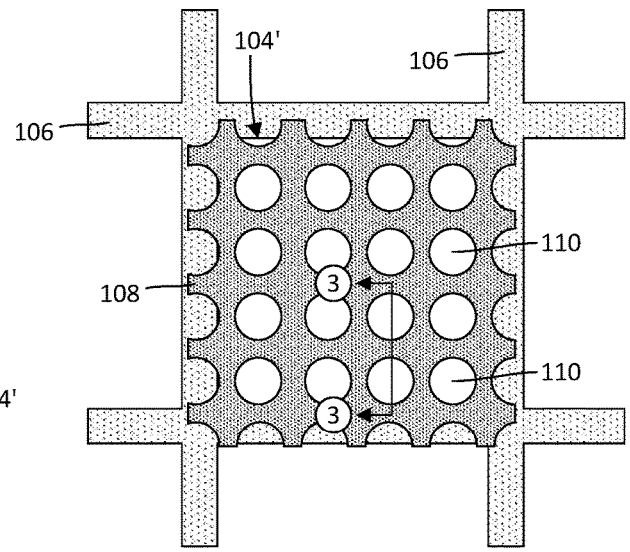
FIG. 2 is a plan view depicting a single grid opening of the grid of FIG. 1.
Figure 3:
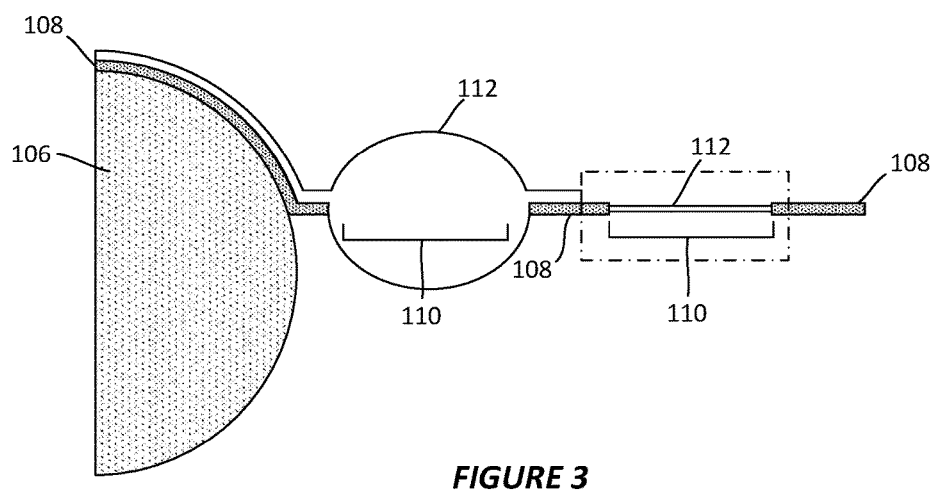
FIG. 3 is a partial sectional view of the grid of FIG. 2, shown along line 3-3.
Figure 4:
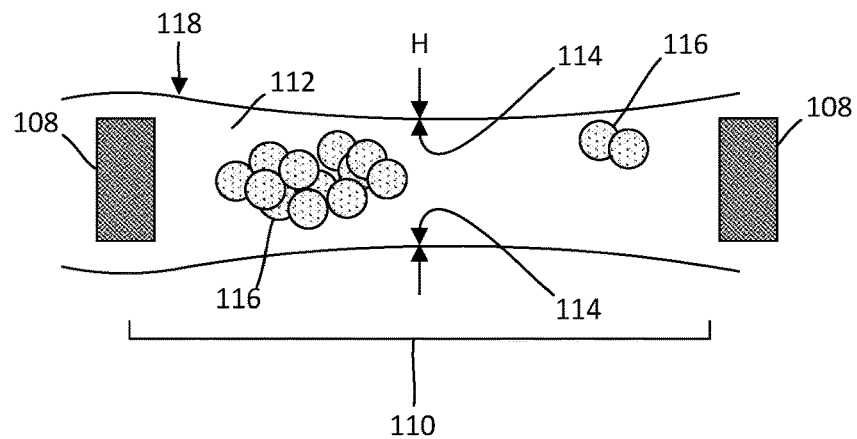
FIGS. 4-6 are detail views of the boxed portion of FIG. 3 that depict a vitreous ice layer that is too thick, too thin, and is ideal, respectively.
Figure 5:
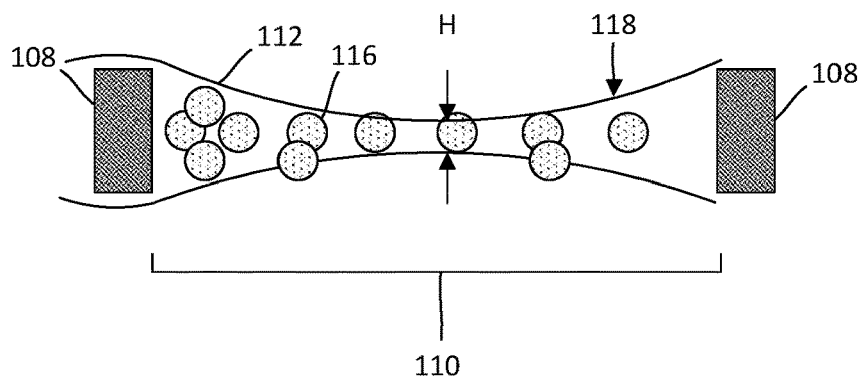
Figure 6:
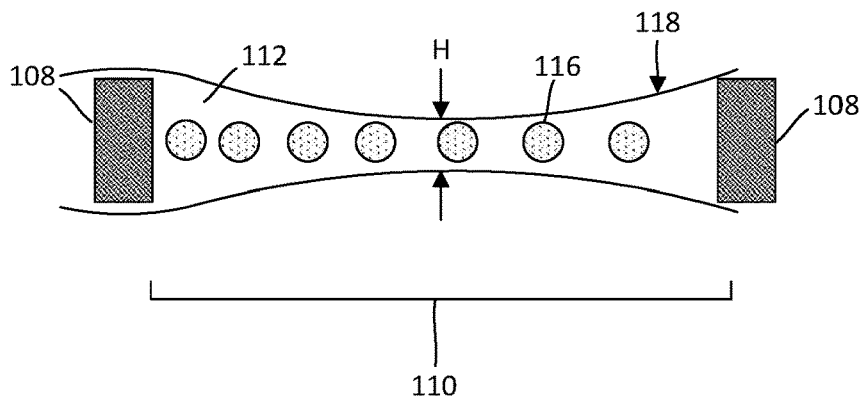
Figure 7:
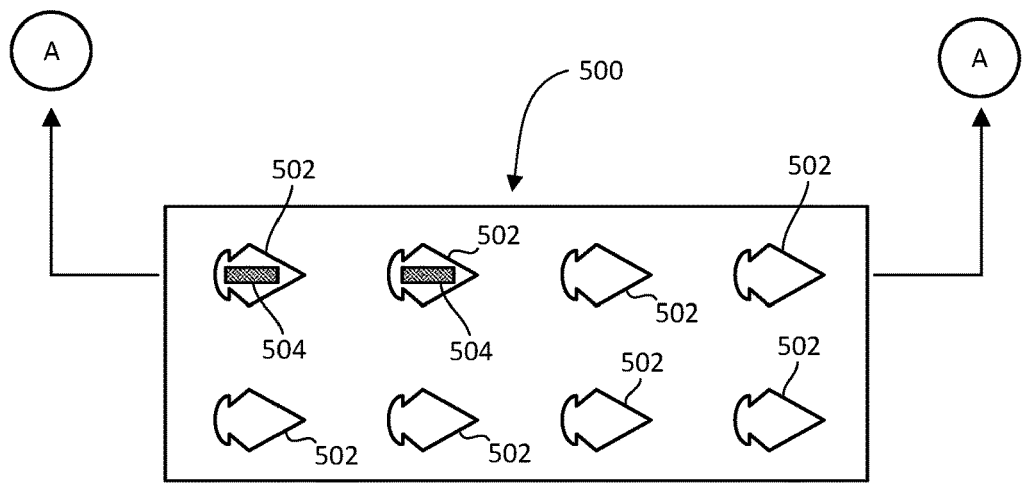
FIG. 7 is a plan view of a grid storage device for storing prepared cryo-EM grids according to an embodiment of the present invention.
Figure 8:
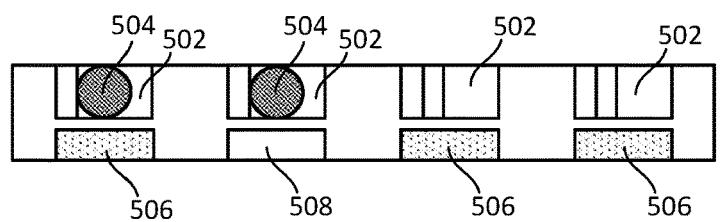
FIG. 8 is a sectional view of the grid storage device of FIG. 7 taken along line A-A.

Accordingly, with reference now to FIGS. 7 and 8, there is provided a grid storage device 500 according to an embodiment of the present invention that may be used to orient proteins on a sample grid to non-uniform (preferably random) orientations through the use of an EMF. In this particular case, storage device 500 is a tray that is provided with a plurality of cavities 502 that are each sized and configured to store a prepared cryo-EM grid 504. The storage device 500 includes an electromagnetic field (EMF) source 506 for producing a magnetic field and/or electric field. Among other things, the EMF source may be a permanent magnet or an electromagnet and may have a fixed or varying strength in space and/or time. In the illustrated embodiment, the EMF source 506 is a separate permanent (e.g., coin-shaped or bar) magnet placed into a lower cavity 508 directly below each grid-storing cavity 502. Thus, the storage device 500 and EMF source 506 are arranged such that the cavities 502 as well as the grids 504 stored in the cavities are exposed to the EMF field.

Figure 9:
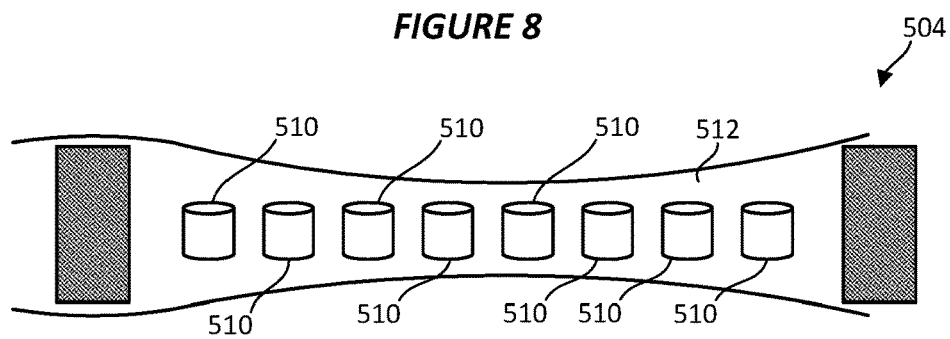
FIGS. 9 and 10 depict a vitreous ice layer having proteins formed on a cryo-EM grid and located outside of an electromagnetic field (EMF) and within an EMF, respectively.
Figure 10:
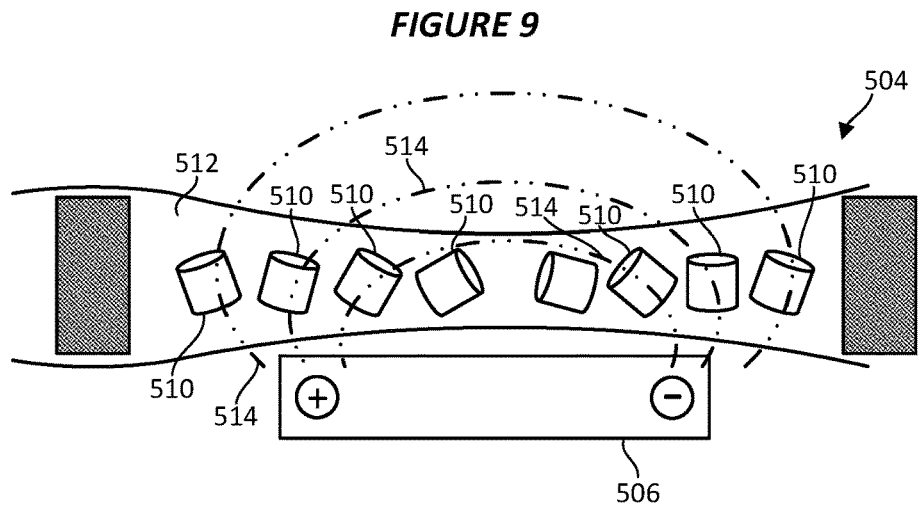

In use, tray 500 is provided with one or more grids 504 that contain a vitrified sample having a least one protein that is receptive to and whose orientation in a three-dimensional space can be modified by an EMF. The EMF source 506 is positioned such that the EMF passes through the grid storage device 500. Advantageously, by exposing the sample to an EMF, the EMF-responsive proteins contained within the sample can be re-oriented from a first orientation, such as the uniform and/or non-randomly distributed, orientation shown in FIG. 9, to a second orientation that is different from the first orientation, such as the non-uniform orientation shown in FIG. 10. Most protein particles have at least a slight overall positive or a slight overall negative charge on their surfaces, which causes them to either align with or against field lines 514 when placed in the presence of an EMF. In this particular case, each of proteins 510 in the liquid sample 512 has at least a slight overall charge that causes the proteins to orient themselves generally parallel with magnetic field lines 514.

It has been traditionally thought that, once vitrification has occurred, individual protein particles in a vitreous ice layer maintain the same fixed arrangement or orientation that they had adopted at the time of vitrification. However, as shown above, by applying an EMF, their orientations may be modified even after vitrification. This rearrangement does not happen quickly; rather, it occurs slowly over long molecular timescales due to the properties of amorphous solids (e.g., days to weeks to years depending on the particular protein properties). There are frequently long wait times (e.g., weeks or months) between the time that a cryo-EM grid is first prepared and when it is ultimately imaged and analyzed. The grid storage device 500 of the present invention takes advantage of this long wait time by applying an EMF to the grid while it is being stored in order to modify the orientation of the proteins embedded in a vitrified ice layer. This alignment modification, thus, improves the quality of the sample grid during the course of that wait time by providing more proteins with random orientations. Accordingly, this also improves the cryo-EM images that are ultimately obtained during analysis of the grid.

Figure 11:
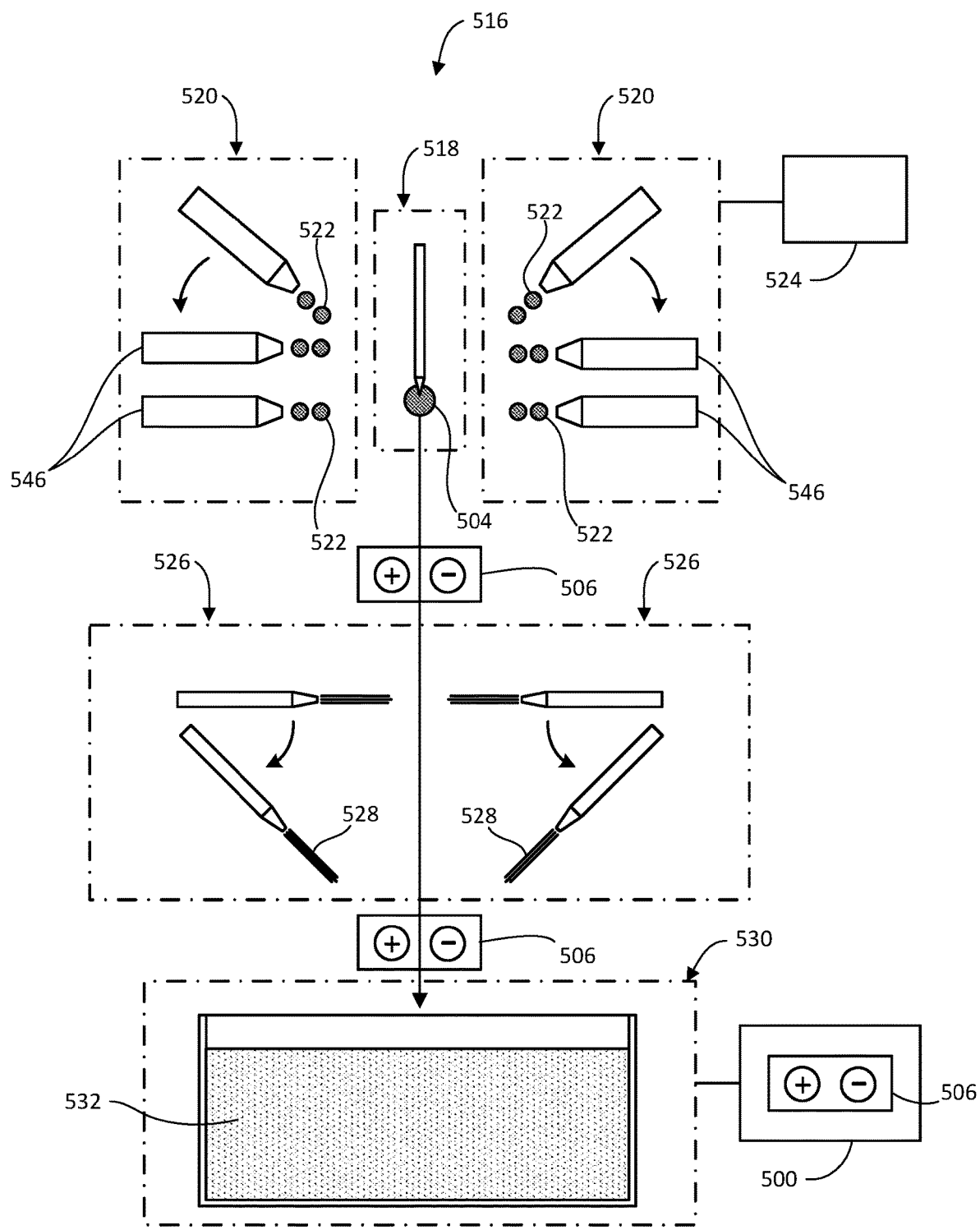
FIG. 11 depicts a system for forming cryo-EM grids having a sample shaping element and one or more EMF sources.

Referring now to FIG. 11, there is provided a system 516 for producing cryo-EM grids. In general, the system 516 includes a grid holding element 518 for holding a grid 504, a sample deposit element 520 for depositing a liquid sample 522, which is provided from a sample reservoir or supply 524, onto the grid, a sample shaping element 526 for modifying and/or shaping the liquid sample located on the grid using one or more jets 528 of gas directed towards the liquid sample located on the grid 504, and a cryogenic sample vitrifying element 530 for vitrifying the sample located on the grid with a cryogen 532. The vitrifying element 530 may include, for example, a cryogenically-cooled stage, a pool of cryogen, one or more jets of cryogen, or the like (referred to generally as a "cryogenically-cooled medium") that is configured to vitrify samples that are exposed to the cryogenically-cooled medium. Lastly, the system 516 may also include a grid storage element 500 for storing cryo-EM grids 504 having vitrified sample. Any of the elements of the system 516 (i.e., elements 518, 520, 526, 530, and 500) or combinations thereof may be moved and rotated in any direction with respect to any other element or combination thereof. For example, in certain embodiments, the grid holding element 518 transports a grid 504 through the system 516 (e.g., extends to lower grid through the system) while the remaining elements of the system remain fixed in place relative to one another. In other embodiments, the grid holding element 518 remains fixed in place while the remaining elements move past the grid 504.

Figure 12:
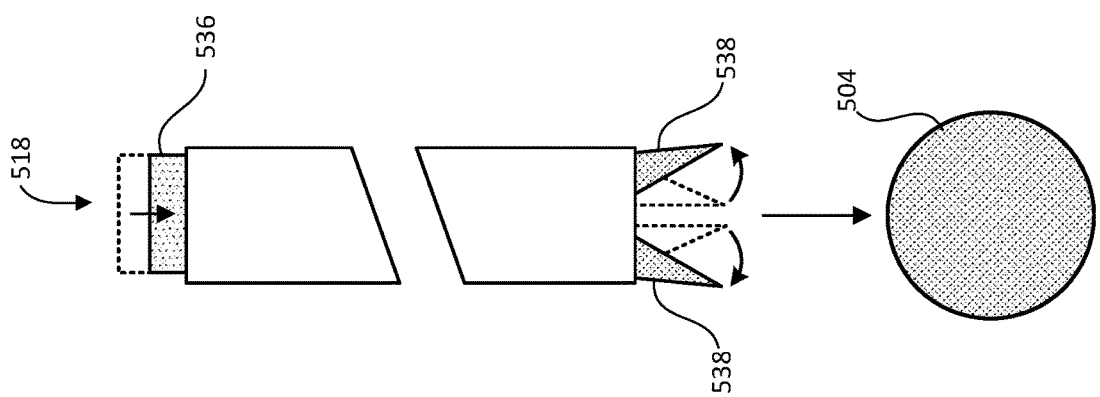
FIG. 12 depicts top and bottom ends of a grid holding element having a manually-actuated mode selector for selectively opening and closing gripper arms for gripping and releasing a cryo-EM grid.

With reference to FIG. 12, in certain embodiments, the grid holding element 518 may include a manually operated gripper device having a manually-actuated mode selector 536, similar to the clicking mechanism for a retractable ballpoint pen, which is configured to switch the gripper between an open mode and a closed mode. The gripper includes two or more gripper arms 538 that, when the gripper is in the open mode, are configured to spread apart and, when the gripper is in the closed mode, are configured to close. For example, in the illustrated embodiment, pressing the selector 536 causes the arms 538 to spread apart, and releasing the selector allows the arms to automatically close. When closed, the arms 538 are configured to engage a cryo-EM grid 504 with a sufficient amount of force that the grid is securely held by the gripper arms.

Returning to FIG. 11, the sample deposit element 520 may include one or more liquid sample dispensers that are configured to deposit a quantity of liquid sample 522 onto EM grids 504 with controllable droplet sizes, volumes, and shapes at an adjustable rate/frequency. The sample dispensers 546 are preferably fully rotatable about any axis and translatable in any direction. In certain embodiments, sample deposit element 520 may include two or more separate sample dispensers that are configured to deposit liquid sample onto the same sample grid 504. The sample dispensers 546 may be configured to deposit liquid sample onto the same or opposite sides of the sample grid 504. Additionally, the sample dispensers 546 may be configured to deposit the same or different liquid samples. Therefore, by using two or more dispensers 546 with two or more different sample types, a combination or mix of samples may be created. In certain embodiments, the sample deposit element 520 is configured to mix the samples in midair (i.e., prior to being deposited on the grid 504), such as by using a single dispenser 546 having a mixing nozzle that can dispense and mix two different samples or by using two separate dispensers (i.e., each with a separate fluid nozzle). In other embodiments, separate dispensers 546 are orientated such that mixing occurs in midair. In still other embodiments, the sample deposit element 520 is configured to mix the samples on the grid. In addition to the orientation and arrangement of the dispensers 546 and the shape of the nozzle, the liquid samples may also be mixed in midair or on the grid 504 using one or more jets 528 of gas of sample shaping element 526.

Liquid samples might be mixed together in order to, among other reasons, observe how the different substances, drug candidates, protein components, etc. contained in those samples interact or respond to one another once mixed. While mixing in midair results in a very well mixed mixture of samples, it also starts the interaction of interest (including chemical reactions and other phenomena) sooner than if the interaction were delayed and instead occurred on the grid 504. By delaying the interaction process (i.e., mixing on the grid rather than in midair), earlier stages of the interaction can be observed in the vitrified samples. Similarly, later stages of the interaction may be observed by starting that same interaction process sooner (i.e., mixing in midair). Thus, by modifying the location and the point in time that two or more samples interact, different phases of the interaction process can be observed in the resulting vitrified sample.

Figure 13A:
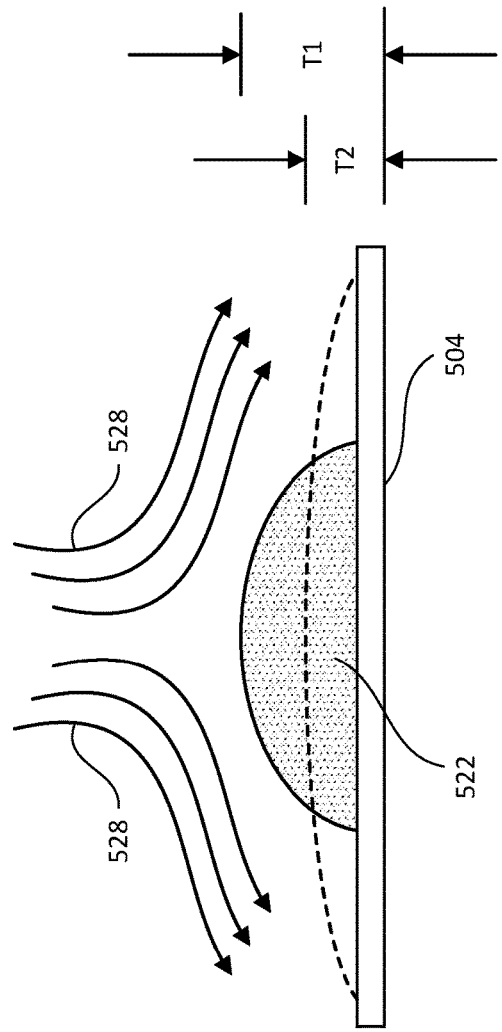
FIGS. 13A and 13B depict a gas jet employed in thinning sample liquid deposited on a top portion of a cryo-EM grid according to embodiments of the present invention.
Figure 13B:
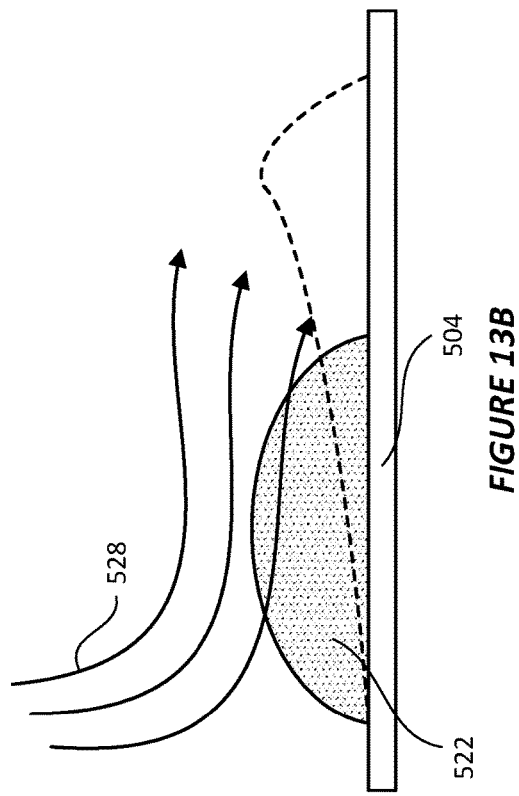

With reference to FIG. 13A, in addition to mixing samples, jets 528 of gas of the sample shaping element 526 (shown in FIG. 11) may also be used to provide blotless (i.e., contactless) thinning of the sample prior to or substantially simultaneously with the vitrification step. Thus, the term "shaping" may include a number of process steps used to modify the shape, structure, composition, etc. of the liquid sample(s), including but not limited, to mixing and thinning liquid sample, including contactless thinning of liquid samples, where the sample is thinned without being physically contacted such as with blotting paper. The gas jet 528 may be configured to thin the liquid sample 522 from a first thickness T1 to a second, smaller thickness T2. Preferably, following the thinning process, substantially all of the liquid sample 522 located on the grid 504 has a second thickness T2 that is less than the first thickness T1. Preferably, as the liquid sample is thinned, it also tends to spread across the surface of the grid 504 to provide a thin, even (i.e., symmetrical) distribution of liquid sample across the surface of the grid. In other embodiments, a thickness gradient (i.e., a gradual transition from one thickness to another thickness) is provided in the liquid sample such that the vitrified sample solution is asymmetrical (as shown in FIG. 13B). These patterns (planar vs. gradient) may be achieved by varying the pattern or motion of the gas jets 528 during the thinning process, particularly where thinning and vitrification occur at the same time. For example, a flat surface may be created by providing a gas jet 528 that remains stationary with respect to the grid or that moves linearly backwards and forwards in a direction that is parallel with the intended planar surface of the vitrified sample solution (i.e., parallel with the top surface of the grid 504, as shown in FIG. 13A). In other cases, a gradient may be formed by moving the gas jet towards or away from the sample (e.g., linearly or in an arc). While only one side of grid 504 (i.e., the top surface) is thinned by gas jets 528 in FIGS. 13A and 13B, it is possible to thin both sides of the grid at the same time. This might occur, for example, while the grid holding element 518 lowers the grid towards the vitrifying element 530, thus passing through multiple gas jets 528 directed at different portions of the grid (e.g., from opposite sides), such that thinning occurs prior to vitrification. In other cases, the liquid sample 522 may be thinned while vitrification is occurring, such as if the grid were placed on a cryogenically-cooled stage.

As discussed above, it has been found that applying an EMF to vitrified samples can improve the quality of the resulting images obtained from the total microscopy process. As such, with reference again to FIG. 11, preferred embodiments of system 516 are provided with one or more EM sources 506. These sources may be located in multiple locations throughout the deposition and vitrification process, including downstream of the sample deposit element 520 after liquid sample has been deposited onto a sample grid 504 and before the shaping element 526 thins or mixes the sample solution(s). An EM source 506 may also be located after the shaping element 526 but before the vitrification element 530. Lastly, as discussed above, an EM source 506 may also be provided in a grid storage device 500 that forms part of the system 516.

Figure 14:
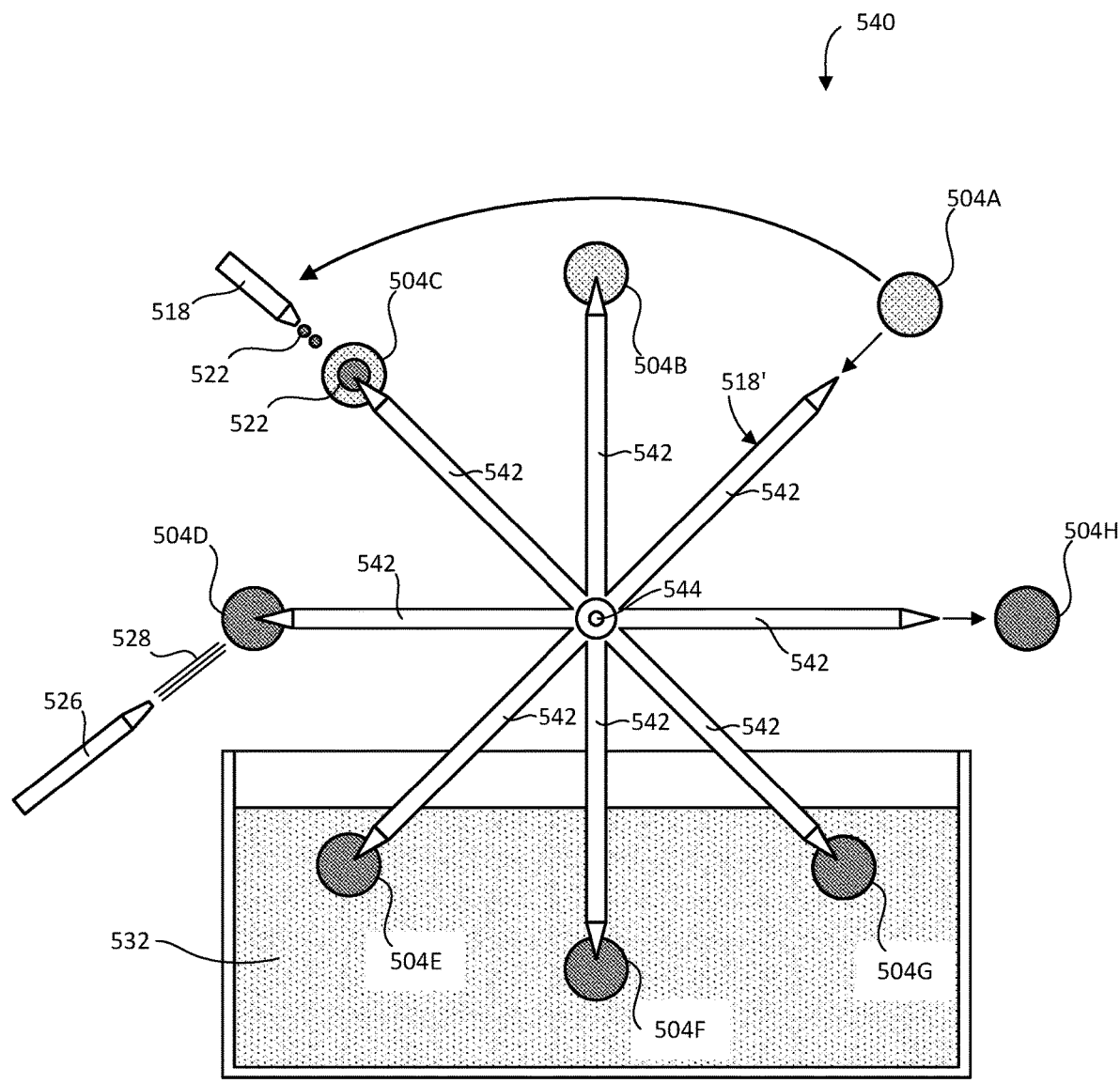
FIG. 14 depicts an alternative system for forming cryo-EM grids having a Ferris wheel-type array of grid holding elements used in automatically forming multiple cryo-EM grids at the same time.

With reference now to FIG. 14, there is provided a system 540 for preparing cryo-EM grids according to an alternative embodiment of the present invention. System 540 includes a Ferris wheel-type rotating grid holding element 518' that is formed by a plurality of spokes 542 that are joined together at a center axis 544 about which the grid holding element is configured to revolve. Grids 504A-50411 are mounted to the spokes 542 and, as the grid holding element 518' revolves, each grid proceeds through various processing stations where a step in preparing cryo-EM grids in a continuous (or semi-continuous) process is performed. Preferably each step is performed automatically and the grid preparation process in a continuous process.

Beginning with grid 504A, at this first station, the grid is placed onto and secured safely at the end of the spoke 542. At the next station, where grid 504B is located, a quality control check may be performed to ensure that the grid is correctly located on the spoke 542 prior to processing and that it is of acceptable quality (i.e., not a damaged grid). This may include a visual inspection performed by a light source, camera, etc. Next, sample solution 522 is deposited onto grid 504C by one or more sample dispensers 546. Next, prior to or substantially simultaneously with vitrification, shaping element shapes the sample solution 522 located on the grid 504D using gas jets 528. As discussed above, this shaping step may include mixing two or more liquid samples together and may also include thinning liquid sample located on the grid in order to prepare the grid for vitrification. Shaping element 526 also spreads sample solution 522 across the surface of grid 504D. Grids 504E-504G are vitrified by, in this particular case, being immersed in a pool of cryogen 532. Other methods for vitrification may also be used, such as by passing grids 504E-504G through a jet or stream(s) of cryogen (i.e., exposure to a cryogenically-cooled medium). Lastly, after vitrification is completed, grid 504H is removed from system 540 and is placed into storage. An EMF source (not shown) may be applied at any location after grid 504C, including during the storage of a completed sample grid.

Although this description contains many specifics, these should not be construed as limiting the scope of the invention but as merely providing illustrations of some of the presently preferred embodiments thereof, as well as the best mode contemplated by the inventor of carrying out the invention. The invention, as described and claimed herein, is susceptible to various modifications and adaptations as would be appreciated by those having ordinary skill in the art to which the invention relates.

What is claimed is:

1. A method for preparing cryogenic electron microscopy (cryo-EM) samples comprising the steps of:
    depositing a liquid sample having a least one protein that is receptive to and whose orientation in a three-dimensional space can be modified by an electromagnetic field (EMF) onto a sample grid using a sample dispenser;
    exposing the sample to an EMF, wherein as a result of being exposed to the EMF, the at least one protein of the sample is re-oriented from a first orientation to a second orientation; and
    vitrifying the sample deposited on the sample grid.

2. The method of claim 1 further comprising the steps of:
    storing the grid with the vitrified sample in a storage device having an EMF source that is configured to provide the EMF; and
    exposing the sample to the EMF within the storage device while the sample is stored in the storage device.

3. The method of claim 1 further comprising the step of exposing the sample to the EMF after the sample is deposited onto the sample grid and before the sample is vitrified.

4. The method of claim 3 further comprising the step of exposing the sample grid to a cryogenically-cooled medium that is provided with an EMF source configured to produce the EMF; and vitrifying the sample through exposure to the cryogenically-cooled medium while the sample grid is exposed to the EMF.

5. The method of claim 3 further comprising the steps of:
    storing the grid with the vitrified sample in a storage device having an EMF source that is configured to provide a second EMF; and
    exposing the sample to the second EMF within the storage device while the sample is stored in the storage device.

6. A method for producing cryogenic electron microscopy (cryo-EM) grids comprising the steps of:
    depositing a first liquid sample onto a cryo-EM grid using a first fluid dispenser such that sample located on the grid has a first thickness;
    shaping the first liquid sample using at least one gas jet produced by a sample shaping element;
    vitrifying the sample deposited on the sample grid after the sample has been shaped by the sample shaping element.

7. The method of claim 6 comprising the step of directing the at least one gas jet of the sample shaping element towards the grid to reduce the thickness of the first liquid sample such that substantially all of the sample on the grid after the thinning has a second thickness that is less than the first thickness.

8. The method of claim 7 further comprising the step of directing separate gas jets of the at least one jet of the sample shaping element towards opposing sides of the grid to reduce the thickness of the first liquid sample such that substantially all of the sample on the grid after the thinning has a second thickness that is less than the first thickness.

9. The method of claim 7 wherein the thickness of the first liquid sample is reduced by the gas jets substantially simultaneously with or prior to the vitrification step.

10. The method of claim 6 further comprising the step of depositing a second liquid sample onto the cryo-EM grid such that liquid sample located on the grid is a combination of the first liquid sample and the second liquid sample.

11. The method of claim 10 wherein the first and second liquid samples are mixed while in midair before contacting the grid.

12. The method of claim 10 wherein the first and second liquid samples are mixed together and thinned using the at least one gas jet produced by the sample shaping element after the liquid samples contact the grid.

13. A system for producing cryogenic electron microscopy (cryo-EM) grids comprising:
    a grid holding element configured to hold a cryo-EM grid while a liquid sample is deposited onto the grid and while the deposited liquid sample is vitrified;
    a sample deposit element configured to deposit liquid sample provided by a sample supply onto the cryo-EM grid held by the grid holding element;
    a sample shaping element configured to shape liquid sample deposited onto the cryo-EM grid; and a cryogenic sample vitrifying element configured to vitrify liquid sample deposited on the sample grid, wherein the cryogenic sample vitrifying element and the grid holding element are configured to move relative to one another.

14. The system of claim 13 further comprising:
a storage element for storing vitrified cryo-EM sample grids having at least one protein;
an EMF source configured to create an EMF within the storage element such that the vitrified sample is exposed to the EMF, wherein as a result of being exposed to the EMF, the at least one protein of the sample is re-oriented from a first orientation to a second orientation.

15. The system of claim 13 wherein the cryogenic sample vitrifying element comprises a cryogenically-cooled stage that vitrifies sample disposed on the sample grid when the grid contacts the stage, a pool of cryogen that vitrifies liquid sample disposed on the sample grid when the grid is placed into the pool, or a jet of cryogen that vitrifies the sample disposed on the sample grid when the grid passes through the jet.

16. The system of claim 13 wherein the grid holding element is a gripper having:
a manually-actuated mode selector that is configured to switch the gripper between an open mode and a closed mode; and
two or more gripper arms that, when the gripper is in the open mode, are configured to spread apart and, when the gripper is in the closed mode, are configured to close and engage the cryo-EM grid with sufficient force that the grid is securely held by the gripper arms.

17. The system of claim 13 wherein the sample deposit element comprising:
a first fluid nozzle configured to deposit a first liquid sample onto the cryo-EM grid held by the grid holding element;
a second fluid nozzle configured to deposit a second liquid sample onto the cryo-EM grid held by the grid holding element, such that the first and second liquid samples are mixed together on the cryo-EM grid.

18. The system of claim 13 further comprising a grid holding element having two or more grid sites that are each configured to receive and securely hold a separate cryo-EM grid, wherein the grid holding element is configured to move with respect to the cryogenic sample vitrifying element such that one of the two or more grid sites is located within a cryogen of the cryogenic sample vitrifying element while another one of the two or more grid sites is not located within the cryogen of the cryogenic sample vitrifying element.

19. The system of claim 13 wherein the sample shaping element comprises at least one gas jet configured to shape liquid sample deposited by the sample deposit element.

* * * * *